June 8, 1943.    W. N. HADLEY    2,321,481
CLOTH SHEARING MACHINE
Filed April 22, 1942    3 Sheets-Sheet 2
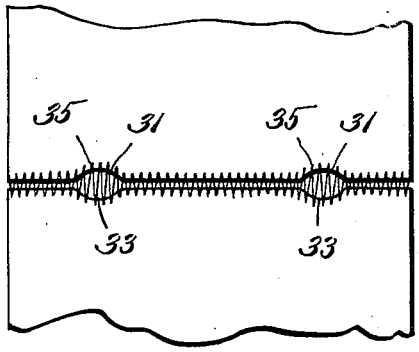
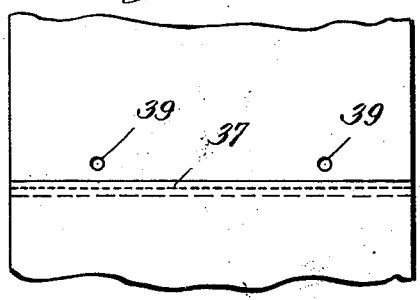
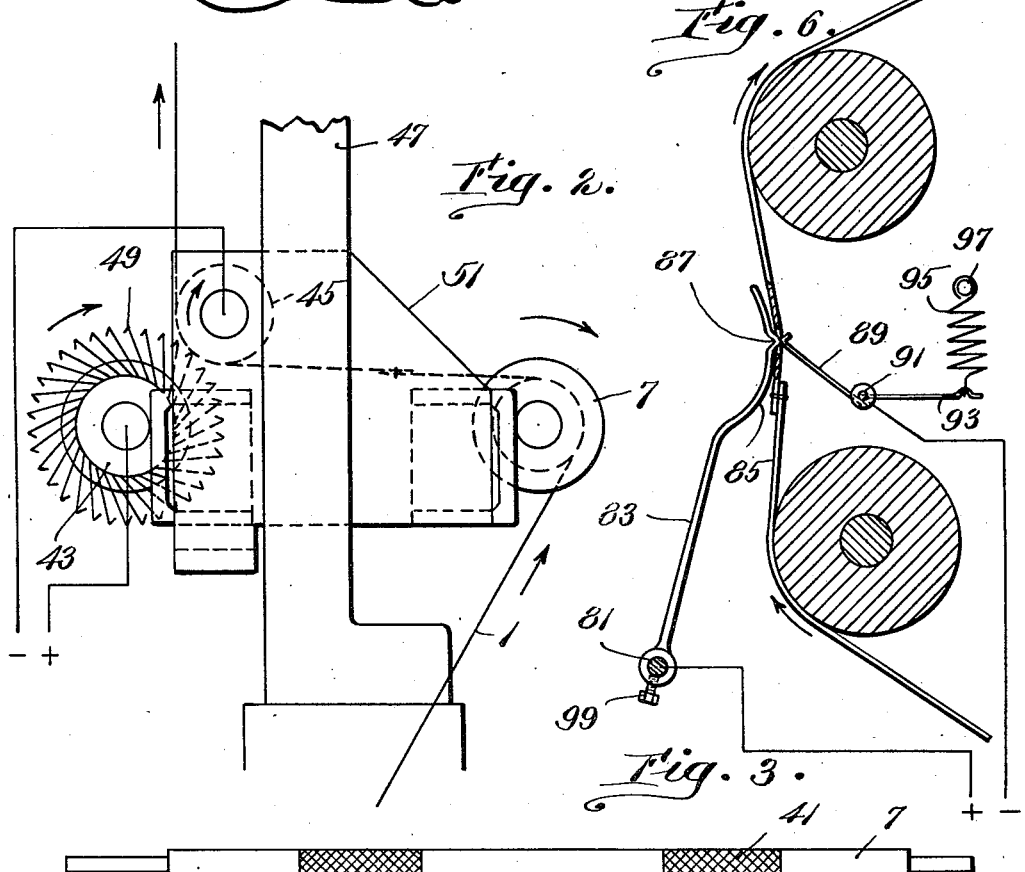
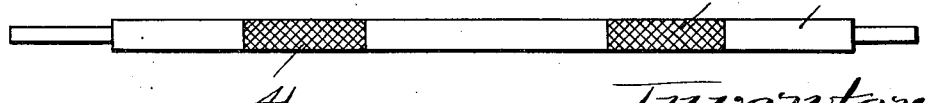
Inventor.
WILFRED N. HADLEY
by Robert K. Randall.
Att'y.

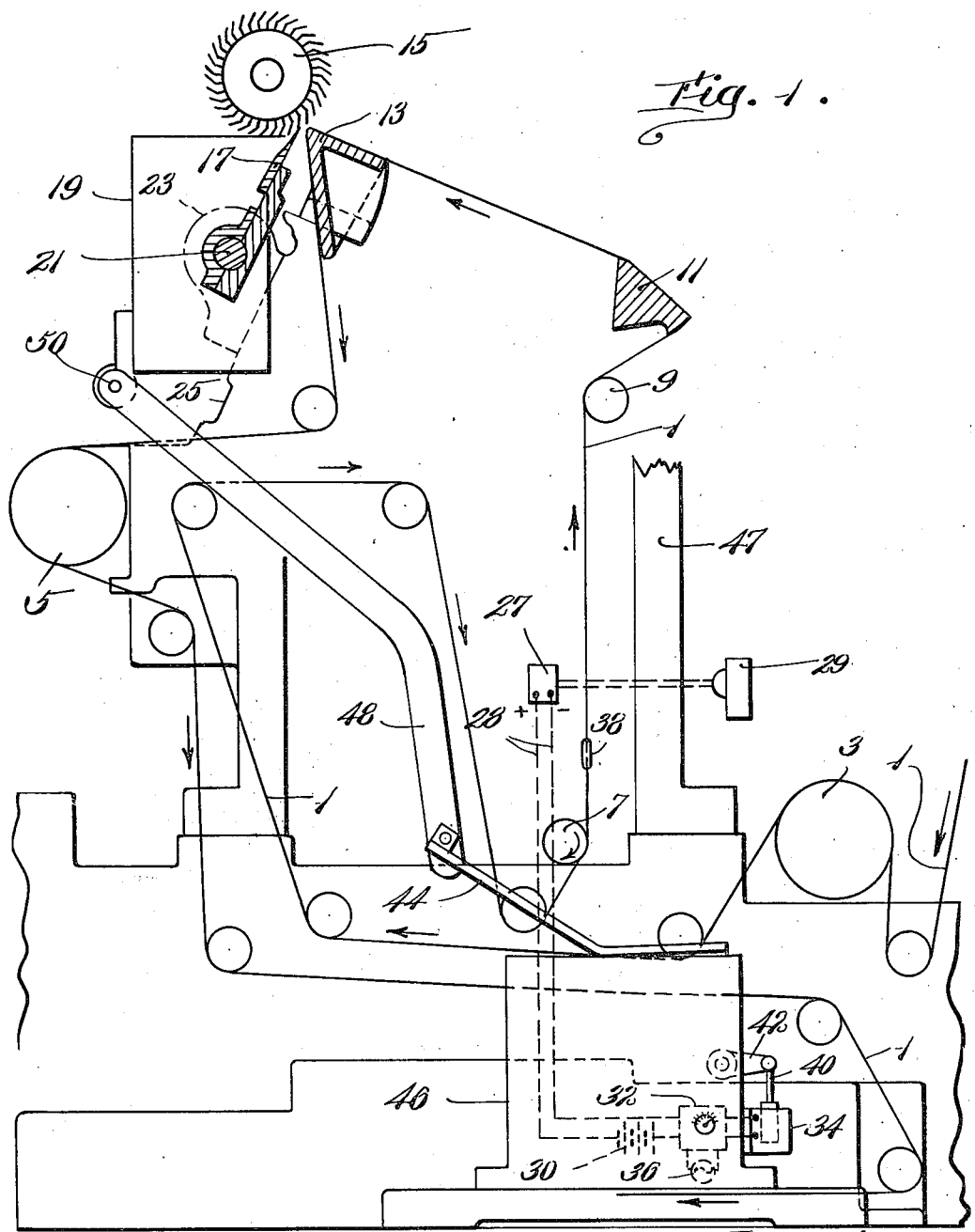

June 8, 1943.   W. N. HADLEY   2,321,481
CLOTH SHEARING MACHINE
Filed April 22, 1942   3 Sheets-Sheet 3
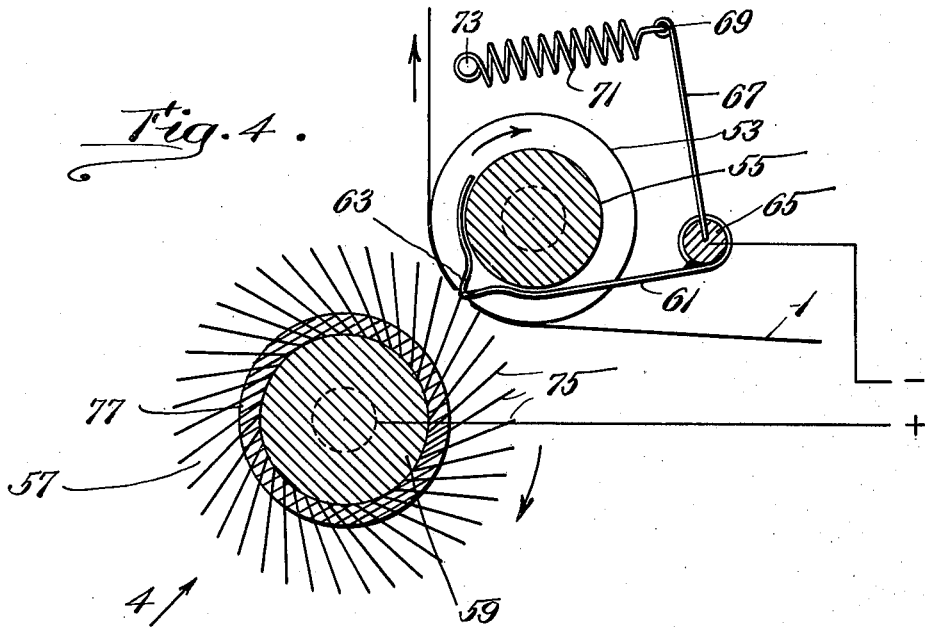
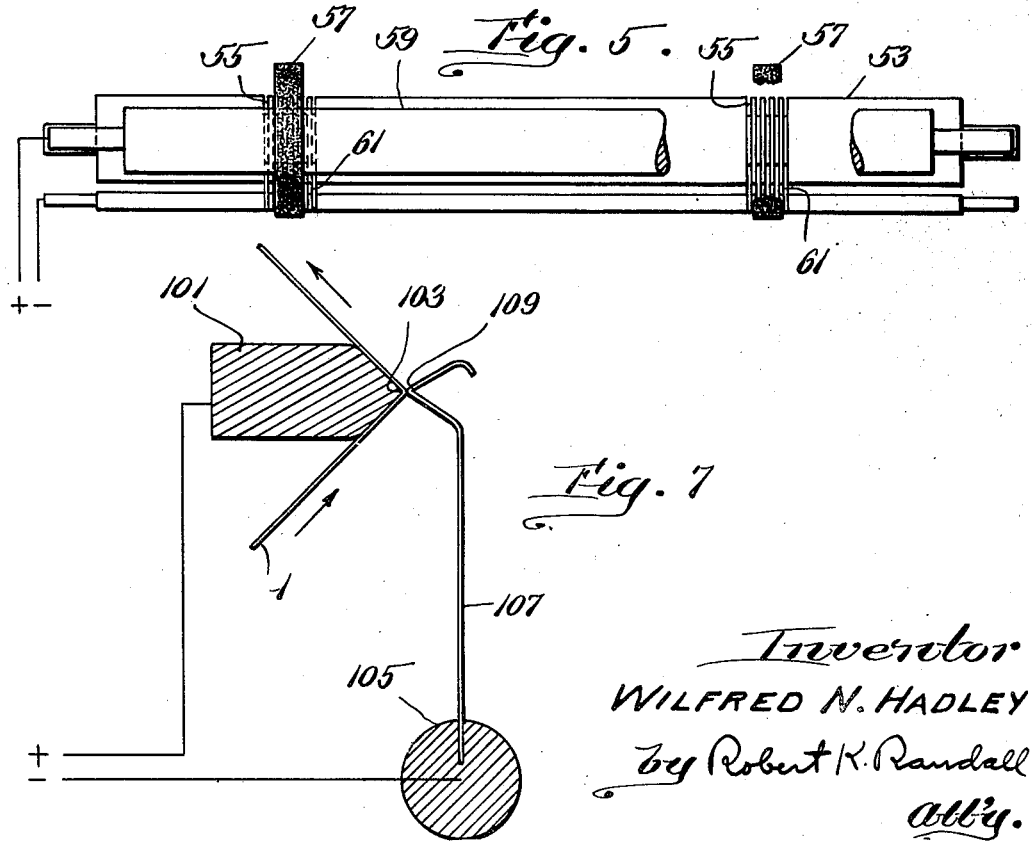
Inventor
WILFRED N. HADLEY
by Robert K. Randall
att'y.

Patented June 8, 1943

2,321,481

UNITED STATES PATENT OFFICE 2,321,481

CLOTH SHEARING MACHINE

Wilfred N. Hadley, Springfield, Vt., assignor to Parks and Woolson Machine Company, Springfield, Vt., a corporation Application April 22, 1942, Serial No. 439,967

19 Claims. (Cl. 26—17)

This invention relates to cloth-shearing machines utilizing rotary shearing blades coacting with stationary ledger blades to shear the protruding fibers at the surface of the cloth to a uniform level of extent. For this purpose, the cloth is run rapidly through the machine and past the shearing devices in flat and open relation, the cloth being supported in close proximity to these coacting blades usually by means of a rest solidly supporting the cloth at the shearing point, the spacing between this rest and the shearing blades being adjustable to suit the thickness of the cloth and the degree of shearing desired, and in practically all cases being so close that the increase in thickness of the traveling web occasioned by the practice of joining one piece or cut of cloth to the succeeding piece will result in cutting and damaging the cloth or injuring the shearing blade if allowed to enter this narrow space. To prevent this injury means are provided for increasing this spacing either by lifting the knives or lowering the rest to remove the cloth from the range of the blades at the vicinity of the seam. The means for doing this were for many years operated solely by hand as the attendant noted the approach of the seam to the shearing blades, but in more modern cloth shears mechanical devices detecting the approach of the seam and automatically increasing the spacing to protect the seams and the blades have been devised and successfully employed; and it is to this latter class of automatic seam-protecting mechanisms that the present invention appertains.

In certain widely used seam-protecting devices of this sort, the increase in thickness of the web at the seam has been made use of to detect the approach of the seam and correspondingly to lift the blades or drop the rest. Since this method of operation causes the devices to respond also to knots, slubs, bunches, or other accidental thickenings or protrusions on the web, thus needlessly suspending the shearing, I have previously devised a seam-protecting mechanism for cloth shears having advantages in simplicity of construction and adjustment and in certainty of operation, utilizing the novel principle of transmitting a detecting or actuating impulse through the web itself or through the path thereof as the end of a piece of cloth passes by the detecting point, this principle and certain of its embodiments in operative forms of mechanism being set forth and claimed in my co-pending application Ser. No. 398,033. The adaptations of the invention principle disclosed in such application include the method of interrupting the continuity of the traveling web between successive pieces of cloth long enough to let a mechanical feeler member reach through the plane of travel of the cloth to transmit a mechanical or electrical impulse to suitable receiving elements located at the opposite surface of the web so as to actuate the blade-lifting or rest-dropping means, the substantially parallel adjacent ends of two pieces or cuts of cloth being joined in spaced relation by stitches which are long and loose and spaced widely enough apart so that the feeler or feelers can reach through the seam and the space purposely left between the two pieces of cloth to make a momentary contact with the impulse-receiving element or electrode and thus close the circuit to initiate the suspension of the shearing; they include also the method of attaching to the cloth or inserting in the cloth at the seam joining successive pieces or at any other desired point an element which will perform the same transmitting function while being of such a nature as not to injure the knives in case of accidental contact therewith, such element being an electrical conductor in the form of a metallic thread or wire of soft and yielding nature such as tinsel or fine copper or aluminum or lead wire which when simultaneously engaged by electrodes or terminals located at opposite surfaces of the cloth will close an electric circuit operating to suspend the shearing in either of the ways indicated.

The present invention comprises an extension of the utilization of the basic principle of my prior application, and constitutes an improvement thereover in the way of increasing the accuracy of detection and certainty of operation, and an increase in the versatility and adaptability of such basic principle. To these ends, it includes the provision of special apertures formed in the web purely for the use of the detecting devices, either in the seam joining successive pieces or in predetermined spaced relation thereto, of ample size to permit the passage of the feeler devices therethrough with ease and certainty. It further includes the provision of special means exerting localized tension on the traveling web to stretch and spread these apertures widely as they are presented to the feeler devices, further to insure the certain passage of the feeler means therethrough. It also includes a novel form of feeler members which cannot accidentally penetrate through the cloth at points apart from the apertures purposely provided and which therefore will not give a false shearing-suspending impulse. The present invention also includes improved contact-making feeler devices which pass through an aperture in the web simultaneously from opposite surfaces of the fabric into engagement with each other, to increase the certainty of making a detecting electrical contact. In addition, it includes improved forms of platens of electrical conducting character, adapted to support and guide the web and to receive with greater certainty the detecting contact of feeler members reaching through the apertures from the opposite surface of the cloth. It further provides a non-mechanical detector device embodying the use of a photo-electric cell or "electric eye" receiving a ray of light passing through the apertures purposely formed in the web, and when thus energized by the ray of light serving to actuate an electrical circuit effecting the momentary suspension of the shearing operation.

Other objects of the invention, and the manner of their attainment, are as set forth in the accompanying description.

Illustrative embodiments of the invention are shown in the accompanying drawings, in which Fig. 1 is a vertical section showing the main parts of one stage of a multiple cloth shearing machine taken transversely of the shearing blades, with the parts not immediately concerned with the invention omitted, showing blade-lifting devices and an electric detecting circuit controlled by a photo-electric cell, and itself controlling the blade-lifting devices.

Fig. 2 is a similar vertical section of certain of the parts of Fig. 1 on an enlarged scale, showing feeler-wires of improved non-penetrating type, together with means in the form of a special tensioning roll acting to hold open the apertures formed in the web for detecting purposes.

Fig. 3 is an elevation of the special tensioning roll of Fig. 2.

Fig. 4 shows in similar transverse vertical section an arrangement of feeler members passing through the purposely formed apertures in the cloth simultaneously from both sides thereof.

Fig. 5 is a view of the parts of Fig. 4 looking in the direction of the arrow 4 of Fig. 4.

Fig. 6 is a vertical section showing a feeler device and platen of non-rotating character.

Fig. 7 is a view similar to Fig. 6 of an alternative form of non-rotating feeler and platen.

Fig. 8 is a face view of the seam joining two adjacent pieces of cloth in spaced relation, showing the method of cutting the ends of the cloth at the seam to provide wide detector apertures therein.

Fig. 9 is a similar face view showing two pieces of cloth joined together by a lapped seam, with special detector apertures formed in the cloth in predetermined spaced relation from such seam.

The drawings show only so much of the cloth guiding and shearing instrumentalities of a standard and well-known Parks & Woolson cloth shearing machine as is necessary for a complete understanding of the application of the invention thereto, most of the framework, guides, drives, and other familiar parts of the machine not concerned with the invention being omitted with the understanding that they are or may be as usual.

In the embodiment of Fig. 1, the course of the web of cloth 1 is as indicated by the arrows, being propelled through the machine by draft rolls 3, 5, and guided by numerous guide rolls 7, 9, over beam 11, and thence over the cloth-rest 13, at the apex of which the shearing is effected by rotary helical blade 15 and cooperating ledger blade 17. As usual, both blades are carried by a swinging supporting structure having brackets 19 at each side of the machine and pivotally mounted on shaft 21 which is mounted for rocking movement in journal boxes 23 adjustable up or down on the frame 25 of the machine. This pivotal mounting enables the blades to be brought into or out of shearing relation with the cloth as the latter passes around the acute angle of the rest 13. Thereafter the cloth passes downward and around draft roll 5 and numerous guide rolls to near floor level, whence it proceeds onward to further processing, in many instances to a second or third shearing in the case of a multiple shear, in which case the devices of Fig. 1 are in general duplicated one or more times in the same machine.

In accordance with the invention, at a convenient point in the course of the cloth prior to its arrival at the cloth-rest 13, herein in the interval of the upward travel of the web between guide rolls 7 and 9, a photo-electric cell or "electric eye" 27 is located at one side of the plane of the traveling web, and at the other side of such plane there is provided a light-supply, of either natural or artificial nature, the latter form being indicated at 29 and comprising an incandescent lamp in a lamp house equipped with a condensing lens, cell 27 being so arranged that light of sufficient intensity to actuate the cell can only reach the latter through the path occupied by the web in passing from guide roll 7 to guide roll 9. Suitable apertures are provided in the web in predetermined relation to the seams which are to be protected by the mechanism so that such apertures when they pass the photo-electric cell 27 will permit sufficient light to strike the cell to actuate the latter.

Photo-electric cell 27 is by wires 28 put in circuit with a source of low voltage current 30 and a time-delay relay 32, which latter acts upon closing of this circuit through actuation of cell 27 to energize a solenoid 34 with power from a higher-voltage source 36, such latter action occurring after the lapse of a period of time determined by the setting of the control knob on relay 32 sufficient to permit the seam 38 to approach to within a few inches of the shearing point at the apex of rest 13. Actuation of the solenoid 34 draws downward its armature which is connected by rod 40 with an arm 42 comprising the control member of a power take-off device enclosed in housing 46 and forming no part of the present invention, since it is the subject of the patent to John W. Hogue #2,305,255, issued December 15, 1942. It suffices for present purposes to state that downward movement of arm 42 causes a lever 44 to rock counterclockwise about a center approximately at the bend therein, thereby pulling down on connected link 48 pivoted at 50 to bracket 19, rocking the swinging structure carrying the blades counterclockwise and lifting the blades away from the rest 13 and the cloth to suspend the shearing and to clear any seam then passing over the rest.

The apertures provided in the web for the purpose of being detected by the photo-electric cell or the other detecting devices herein may be provided as in my prior application by simply joining the adjacent ends of two successive pieces or cuts of cloth being shorn in spaced-apart relation by long, loose stitches extending mainly lengthwise of the cloth so that a space of at least ⅛ inch or preferably more will be left between the end of one piece of the cloth and the beginning of the next piece. But preferably, when the seam itself is thus to be used to provide the actuating apertures, the normally straight edges of the meeting ends of the successive pieces of cloth are each cut away at corresponding intervals as indicated at 31 and 33 in Fig. 8, and then united by long, loose stitches 35, these widened portions of the space left between successive pieces in the web letting through the light from the lamp 29 or other supply in greater volume than might otherwise occur with the slit bounded by parallel edges of cloth, thus making more certain the actuation of the cell. The widened portions of the seam are of course located in those zones of the width of the cloth which intervene between the cell and the light-supply; the form of Fig. 8 has two such apertures formed by widening the seam locally, because two photo-electric cells in parallel, each controlling the shearing-suspending devices, are usually employed to extend the period of suspension of the shearing when the seam runs across the web obliquely. This form is also used with the mechanical contact-making feeler members yet to be described.

It is preferred in certain instances to form the apertures which let the detecting impulse through the plane of the traveling web, in a location apart from the seam itself. This is done where the nature of the cloth makes it preferable to use the customary lapped seam 37 of Fig. 9, or where the spaced relation of the apertures away from the seam is utilized to time the suspension of the shearing action with regard to the arrival of the seam at the shearing point, without the use of the time-delay devices otherwise needed to synchronize these two events; or for other reasons. Thus, as in the first case just referred to, clean-cut round holes 39, Fig. 9, of ¼ inch or more in diameter are punched in the cloth at the proper point in the width thereof to pass between the photo-electric cell and its light-supply and thus admit to the cell light of sufficient intensity to actuate the latter to suspend the shearing. Being located close to the seam in a portion of the cloth which must be discarded anyway from the finished goods, such practice entails no added waste of the material. Likewise, when used for timing and located apart from the seams, the light-holes 39 are placed close to or in the selvages and thus entail no material damage since these parts are customarily discarded also in use. Like the widened apertures in the seams, these punched holes 39 are also employed with the mechanical contact-makers to be described hereinafter.

To make sure that the apertures purposely formed in the web remain wide open to let the shearing-suspending impulse pass through with certainty, means are provided to exert a localized warpwise tension on the web in the zones of its width in which these apertures are located. Thus, in Fig. 1, the lower guide roll 7 engaging the web 1 immediately before it passes the photo-electric cell 27 is rotated as indicated by the arrow in a direction causing its surface to travel reversely to the direction of travel of the web sliding thereover, and has knurled areas 41 on its surface increasing its frictional engagement with the cloth in the zones of the latter where the apertures are located. Thus the knurled areas increase the warpwise tension on the cloth in these zones over that existing throughout the rest of the width of the web, and so pull the apertures wide open during their passage past the detecting means.

In Fig. 2 is shown an improved form of mechanical contact-making device, related to the rotary feeler device disclosed in my co-pending application referred to. By way of improvement thereover, though, the tips of the resilient feeler-wires projecting from the surface of roll 43 to form the brush rings in the zones of the apertures formed in the cloth are each bent at a sharp angle so that the free ends of the wires point back in a general direction toward the solid portions of the roll. At the same time, the direction of rotation of the roll is reversed with respect to that of my prior application just referred to. Thus, the knees of the bends in the free ends of the wires now make wiping contact with the proximate surface of the cloth instead of using the rather sharp ends of the wires, and by their convexity and increased bearing surface avoid penetration through the cloth where there are no purposely formed apertures and thus avoid giving a false impulse suspending the shearing when unnecessary to do so. Further, the rotation of the roll so that the tips of the feeler-wires travel in the opposite direction to that of the travel of the cloth, coupled with the backward slant of the wires, prevents all chance of the bent ends 49 of the wires poking through even a loosely-woven fabric to make contact with the platen roll 45 to give a false signal. In the prior device, slight lost motion in the respective drives for the fabric and for the feeler roll located in the position of present roll 43, sometimes caused the cloth to start moving before such roll began to turn, or to start moving faster than such roll, thus causing the points of the wires to penetrate through the cloth to make unwanted contact with the platen roll; in other instances, movement of the cloth a fraction of an inch through contraction after stopping the machine likewise caused penetration of the wires through the cloth. In either event, a false signal was transmitted as the machine was started up, which difficulty has been completely remedied by the present arrangement. As before, rolls 43 and 45 are respectively in electrical connection with one of the two wires 28 of Fig. 1, the rest of the circuits and the devices controlling the lifting of the blades being as in Fig. 1. The rolls of Fig. 2 are mounted in bearings in connection with brackets 51 on uprights 47 of the frame in substantially the same location as the photo-electric cell 27, but spreader roll 7, also used in this embodiment, is located at nearly the same level as feeler roll 43, serving as before to spread the apertures purposely formed in the web 1 so that the bent ends 49 of the feeler wires, grounded on the metallic central portion of roll 43, will contact platen roll 45 through such apertures to close the circuit and thus effect suspension of the shearing. Use of the non-rotating feelers 107 of Fig. 7 in place of roll 43 in this same set-up also gives good results.

The embodiment of Figs. 4 and 5 is another alternative form of mechanical contact-making feeler device taking the place of the electric eye of Fig. 1 or the rolls 43 and 45 of Fig. 2 in the same operative circuits and linkage of Fig. 1 to effect the lifting of the blades away from the cloth. In this alternative structure the contact-making feeler devices pass through an aperture in the web simultaneously from opposite surfaces of the fabric into engagement with each other, to increase the certainty of making a detecting electrical contact. Thus with the cloth 1 following the same horizontal course from right to left after leaving roll 7 of Fig. 2, it passes around a platen roll 53, which has a number of deep peripheral grooves 55 formed in groups therein at two locations in its length which correspond to the locations of the rings 57 clothed with resilient wires, which are located in spaced relation on feeler roll 59 so as to encounter the apertures formed by the cuts 31, 33, in the meeting ends of the successive pieces forming the web, or to encounter the holes 39 provided in spaced relation to the seams, or merely to enter the space purposely left between successive pieces joined by long stitches in spaced relation. In each of these grooves is housed a resilient wire feeler-member 61, bent as shown in Fig. 4 to conform to a part of the circuit of the bottom of its groove, but having a salient bend or knee 63 formed so as to be approximately in the plane joining the axes of rolls 53 and 59. These feeler members 61 are fixed to a common rockshaft 65, carried in bearings suitably mounted on frame-members 47, and having an arm 67 fixed therein and attached at 69 to a contracting coil spring 71 anchored at 73 on the machine frame and thus tending to rotate rockshaft 65 counter-clockwise in Fig. 4 to thrust the knees 63 against one surface of the cloth 1 at the same locality where the free ends of the wires 75 of the rings 57 on feeler roll 59 wipe against the outer surface of cloth 1. As before, feeler roll 59 is connected to one branch of the wires 28 in the circuit controlling the linkage actuated thereby in Fig. 1, wires 75 passing through the backing 77 to make electrical connection with roll 59 as in Fig. 2; at the same time, rockshaft 65 is in electrical connection with the other branch of the wires 28. Thus, when an aperture purposely provided in the web arrives in position between rolls 53 and 59, as is indicated in Fig. 4, the knees 63 of wires 61 move outwardly through such aperture into contact with wires 75 on roll 59, while wires 75 move inwardly through the aperture to contact the wires 61 and also the fins of roll 53 which define the grooves 55. As in the case of Fig. 2, feeler roll 59 rotates clockwise, while its wires 75 slant backward, diminishing the likelihood of accidental and unwanted penetration through the cloth where the latter is continuous and thus giving a false signal; the extremities of wires 75 are bent reversely as illustrated at 49 in Fig. 2 in case trouble is experienced in this respect.

In the form of contact-making detector shown in Fig. 6, a fixed rod 81 mounted on the side frames of the machine has two non-rotating metallic pressers 83 fixed thereon so that each presses against the surface of the traveling web in the zone of location of one of the two apertures purposely provided in the web, or in suitable spaced relation in case merely the open seam is used. These pressers have a curved face 85 extending widthwise of the cloth for around 2 inches, on which face is a low rib 87 extending transversely of the cloth. The other surface of the traveling web is engaged exactly opposite the rib 87 by the bends or knees formed in the ends of feeler-wires 89 fixed on a rockshaft 91 suitably supported in bearings on the machine frame and rocked, by arm 93 and contracting spring 95 anchored at 97, in a direction pressing the knees against the cloth. Localized pressure of pressers 83 increases the tension in the zones where the apertures are formed in the web, thereby to insure their being fully open. The bent portions of the ends of feeler-wires 89 reach through the apertures to make contact with the salient ridged portion of the cloth-engaging face of presser 83 when the apertures in the web come into position to permit such contact. A set-screw 99 provides for varying the pressure of presser 83 against the cloth to insure opening up the apertures. As before, presser 83 is connected to one of the wires 28 of the circuits and linkage shown in Fig. 1, while rockshaft 91 is connected to the other of such wires, so that when the feeler-wires 89 touch the platen or presser 83 the circuit through wires 28 will be closed to suspend the shearing.

In Fig. 7 is shown a greatly simplified form of mechanical circuit-closing feeler device for use in the circuit and linkage of Fig. 1, in place of the photo-electric cell. It comprises a stationary platen in the form of a bar or other member 101 extending transversely of the path of the web, having a convex surface or edge 103 against which the cloth 1 is drawn and about which the cloth changes its direction of travel, the bar or at least the convex or salient portion 103 thereof being of electrical conducting material and connected to one of the wires 28 of Fig. 1. At the other surface of the cloth from that engaged by bar 101, a plurality of feeler-wires arranged side by side in close proximity as in Fig. 5 so as to cover the zones where the apertures are provided in the web, are fixed to a rod 105 which is itself fixed in the machine frame after rotating it sufficiently to cause the knees 109 formed at the free ends of feeler-wires 107 to press lightly against the cloth along the high-point of the edge 103. When the apertures, or the space between the proximate ends of adjacent pieces, reach the ridge 103, the knees 109 reach through to make electrical contact with the ridge, which closes the circuit including wires 28 to actuate the shearing-suspending means, rod 105 being connected to the other wire 28.

While I have illustrated and described certain forms in which the invention may be embodied, I am aware that many modifications may be made therein by any person skilled in the art, without departing from the scope of the invention as expressed in the claims. Therefore I do not wish to be limited to the particular forms shown, or to the details of construction thereof, but What I do claim is:

1. In a cloth shear, in combination, means propelling, guiding, and shearing a web of cloth composed of successive pieces united end to end by seams and having apertures in predetermined relation to such seams, means detecting such apertures and thereupon suspending the shearing action, and means exerting localized tension on the web in the zone of the width thereof in which the apertures are located to open up such apertures for detection.

2. In a cloth shear, in combination, means propelling, guiding, and shearing a web of cloth composed of successive pieces united end to end by seams and having apertures in predetermined relation to such seams, means detecting such apertures and thereupon suspending the shearing action, and a roll around which the web travels, rotating reversely to the direction of travel of the web, and having areas having a high coefficient of friction which exert a localized tension on the web in the zone of the width thereof in which the apertures are located.

3. In a cloth shear, in combination, means propelling, guiding, and shearing the cloth, a light-actuated element normally shielded from light rays of actuating intensity by the cloth, and means suspending the shearing operation and called into action by such element when an interruption in the continuity of the cloth admits light to such element.

4. In a cloth shear, in combination, means propelling, guiding, and shearing the cloth, a photo-electric cell shielded from actuating light rays by the cloth, and means suspending the shearing operation when an interruption in the continuity of the cloth admits actuating light rays to the cell.

5. In a cloth shear, in combination, means propelling and guiding the cloth in continuous web form in a fixed path, a photo-electric cell at one side of said path, a light-supply at the other side of such path, the light from such supply being kept from such cell by the intervening cloth so long as the web remains continuous and entire, shearing means acting on the cloth, and means suspending the shearing action of the shearing means in response to actuation of the photo-electric cell when an interruption of the continuity of the web lets light from the light-supply fall on the cell.

6. In a cloth shear, in combination, means propelling, guiding, and shearing the cloth, means acting to suspend the shearing action of the shearing means, a photo-electric cell actuating the shearing-suspending means, a light-supply directing at the cell a ray of light which is intercepted by the cloth so long as the latter is continuous throughout the zone thereof scanned by the ray, but which energizes the cell to effect suspension of the shearing when the ray is allowed to pass through a break in the continuity of the cloth.

7. The method of protecting the seams joining successive pieces of cloth being shorn in a cloth shear from injury by the shearing knives which includes providing apertures in the cloth in predetermined relation to the seams, creating at one surface of the cloth a continuously acting impulse tending to suspend the shearing action of the shearing knives, and receiving such impulse at the other surface of the cloth and employing it to suspend the shearing, the intervening cloth preventing the transmission of the impulse except through the apertures in the cloth.

8. The method of protecting the seams joining successive pieces of cloth being shorn in a cloth shear from injury by the shearing knives which includes providing apertures in the cloth in advance of the seams, creating at one surface of the cloth a continuously acting impulse tending to suspend the shearing action of the shearing knives, and receiving such impulse at the other surface of the cloth and employing it to suspend the shearing, the intervening cloth preventing the transmission of the impulse except through the apertures in the cloth.

9. The method of protecting the seams joining successive pieces of cloth being shorn in a cloth shear from injury by the shearing knives which includes providing apertures in the cloth in predetermined relation to the seams, creating at one surface of the cloth a continuously acting impulse tending to suspend the shearing, action of the shearing knives, and receiving such impulse at the other surface of the cloth and employing it to suspend the shearing the intervening cloth preventing the transmission of the impulse except through the apertures in the cloth, and the location of the apertures serving to time the suspension of the shearing with respect to the passage of the seams past the knives.

10. In a cloth shear, in combination, means propelling, guiding and shearing a web of cloth composed of successive pieces united end to end in spaced relation by stitches, means suspending the shearing action to avoid cutting the stitches, and devices actuating the shearing-suspending means by transmitting an impulse through the space between the ends of the successive pieces, with certain portions of the ends of the successive pieces disposed in non-parallel relation to increase the space between for the accommodation of the said devices.

11. In a cloth shear, in combination, means propelling, guiding, and shearing a web of cloth composed of successive pieces united end to end by seams and having apertures in predetermined relation to such seams, means suspending the shearing operation, an electrical circuit controlling the shearing-suspending means, feeler wires in such circuit having bends which press against one surface of the web to enter the apertures when the latter are presented to the wires by the travel of the web, and an electrically-conducting element at the other surface of the cloth, included in the electric circuit, and engaged by the bends of the feeler wires which enter the apertures to complete the circuit and actuate the shearing-suspending means.

12. In a cloth shear, in combination, means propelling, guiding, and shearing a seamed web of cloth having apertures in predetermined relation to such seams, means suspending the shearing operation including an electrical circuit actuating such means when closed, a roll in such circuit having peripheral grooves and around which the web travels, feeler fingers in such grooves in electrical connection with the roll and resiliently pressing outward therefrom against the portion of the web that is around the roll, and an electrically conducting element at the opposite surface of the web also in such circuit and engaged by the feeler fingers through the apertures in the web to complete the electrical circuit and thus to suspend the shearing.

13. In a cloth shear, in combination, means propelling, guiding, and shearing a seamed web of cloth having apertures in predetermined relation to such seams, means suspending the shearing operation including an electrical circuit actuating such means when closed, a roll in such circuit having peripheral grooves and around which the web travels, feeler fingers in such grooves in electrical connection with the roll and resiliently pressing outward therefrom against the portion of the web that is around the roll, and a roll also in such circuit having outwardly - extending feeler - wires brushing against the convex surface of the web opposite the feeler fingers to make circuit-closing contact therewith through the apertures.

14. In a cloth shear, in combination, means propelling, guiding, and shearing a seamed web of cloth having apertures in predetermined relation to such seams, means including an electric circuit suspending the shearing action, and wires in such circuit pressing against opposite surfaces of the traveling web to make contact with each other through the apertures to close the circuit and suspend the shearing.

15. In a cloth shear, in combination, means propelling, guiding, and shearing a seamed web of cloth having apertures in the web in predetermined relation to the seams, means including an electric circuit suspending the shearing action when closed, a stationary conducting element in such circuit having a salient ridge disposed across and in contact with one surface of the traveling web, and wires also in such circuit resiliently pressing against the other surface of the web, the wires having bends of which the convex sides bear against the web and make contact through the apertures in the web with the salient ridge on the stationary element to close the circuit.

16. In a cloth shear, in combination, means propelling, guiding, and shearing a seamed web of cloth having apertures in predetermined relation to such seams, means including an electric circuit suspending the shearing action when the circuit is closed, a stationary electrical conducting element in such circuit having an edge disposed transversely across and in contact with one surface of the web and around which the web bends in its course, and wires also in such circuit having bent extremities of which convex portions are resiliently pressed against the other surface to the web to make circuit-closing contact with such transverse edge through the apertures in the web.

17. In a cloth shear, in combination, means propelling, guiding, and shearing a seamed web of cloth having apertures in predetermined relation to such seams, means including an electric circuit suspending the shearing action when the circuit is closed, a roll in such circuit supporting the web at one of the latter's surfaces, and a second roll rotating reversely to the travel of the web having resilient wires also in the circuit and projecting from the surface of the roll in wiping contact with the other surface of the web opposite the first roll, the projecting ends of the wires being bent to prevent their penetrating the web except at the apertures formed therein.

18. In a cloth shear, in combination, means propelling, guiding, and shearing a seamed web of cloth having apertures in predetermined relation to such seams, means including an electric circuit suspending the shearing action when the circuit is closed, a roll in such circuit supporting the web at one of the latter's surfaces, and a second roll rotating reversely to the travel of the web having resilient wires also in the circuit and projecting from the surface of the roll in wiping contact with the other surface of the web opposite the first roll, and making contact with the first roll through the apertures to close the circuit.

19. In a cloth shear, in combination, means propelling, guiding, and shearing a seamed web of cloth having apertures in predetermined relation to such seams, means suspending the shearing action including an electric circuit actuating such means so as to suspend the shearing when closed, a stationary cloth rest having an edge around which the traveling web changes its course, such edge being of electrical conducting material and included in such circuit, and feeler-wires also in such circuit having at their end portions knees which press against the web where it is supported by such edge, and which make contact with the latter through the apertures to close the circuit.

WILFRED N. HADLEY.